US007646793B2

(12) United States Patent
Ichimura et al.

(10) Patent No.: US 7,646,793 B2
(45) Date of Patent: *Jan. 12, 2010

(54) TRANSMISSION METHOD, TRANSMISSION APPARATUS AND TRANSMISSION SYSTEM

(75) Inventors: Gen Ichimura, Tokyo (JP); Yoshio Osakabe, Tokyo (JP); Takehiko Nakano, Tokyo (JP); Yumiko Ohnuki, Tokyo (JP)

(73) Assignee: Sony Corporation (JP)

( * ) Notice: Subject to any disclaimer, the term of this patent is extended or adjusted under 35 U.S.C. 154(b) by 671 days.

This patent is subject to a terminal disclaimer.

(21) Appl. No.: 11/109,051

(22) Filed: Apr. 19, 2005

(65) Prior Publication Data

US 2005/0188097 A1   Aug. 25, 2005

Related U.S. Application Data

(63) Continuation of application No. 09/744,429, filed on Jun. 13, 2001, now Pat. No. 6,947,422.

(51) Int. Cl.
*H04J 1/02* (2006.01)
(52) U.S. Cl. .................. 370/493; 370/352; 370/392
(58) Field of Classification Search .................. None
See application file for complete search history.

(56) References Cited

U.S. PATENT DOCUMENTS

| | | | |
|---|---|---|---|
| 5,933,430 | A | 8/1999 | Osakabe et al. |
| 6,141,702 | A | 10/2000 | Ludtke et al. |
| 6,169,725 | B1 * | 1/2001 | Gibbs et al. .................. 370/216 |
| 6,243,395 | B1 | 6/2001 | Fujimori et al. |
| 6,266,344 | B1 | 7/2001 | Fujimori et al. |
| 6,279,061 | B1 * | 8/2001 | Aoki et al. ..................... 710/65 |
| 6,304,553 | B1 | 10/2001 | Gehman et al. |
| 6,324,178 | B1 | 11/2001 | Lo et al. |
| 6,341,319 | B1 * | 1/2002 | Inoue et al. ................... 710/52 |
| 6,463,059 | B1 | 10/2002 | Movshovich et al. |
| 6,512,767 | B1 * | 1/2003 | Takeda et al. ............... 370/389 |
| 6,618,396 | B1 | 9/2003 | Kondo et al. |
| 6,633,547 | B1 | 10/2003 | Akatsu et al. |

(Continued)

FOREIGN PATENT DOCUMENTS

EP   0 762 684 A2   3/1997

(Continued)

OTHER PUBLICATIONS

1394 Tradeassocation, "Audio and Music Data Transmission Protocol", Version 1.0, May 1997, pp. 14-17 (http://www.1394ta.org/Technology/Specifications/specification.htm).

*Primary Examiner*—Phirin Sam
(74) *Attorney, Agent, or Firm*—Lerner, David, Littenberg, Krumholz & Mentlik, LLP

(57) ABSTRACT

In order to satisfactorily transmit audio data of various formats through a transmission line, when data having a predetermined data length as a unit is transmitted by a predetermined format between devices connected to a predetermined transmission line, label data indicating a system of transmitted audio data is located at a starting portion of the data having the predetermined data length, sub-label data is located at an interval behind label data if necessary and data accompanying with audio data is located and transmitted, whereby a side which receives this data can easily identify a system of audio data or the like.

9 Claims, 20 Drawing Sheets

U.S. PATENT DOCUMENTS

| | | | |
|---|---|---|---|
| 6,788,653 B1 * | 9/2004 | Sakamoto et al. | 370/282 |
| 6,804,250 B2 | 10/2004 | Hatae et al. | |
| 6,839,322 B1 * | 1/2005 | Ashwood Smith | 370/235 |
| 6,947,422 B1 * | 9/2005 | Ichimura et al. | 370/392 |
| 6,973,258 B1 * | 12/2005 | Yoo et al. | 386/111 |
| 7,181,298 B1 * | 2/2007 | Yoshio et al. | 700/94 |
| 2004/0141494 A1 * | 7/2004 | Beshai et al. | 370/352 |

FOREIGN PATENT DOCUMENTS

| | | |
|---|---|---|
| EP | 0 833 514 A2 | 4/1998 |
| JP | 9-116593 A | 5/1997 |
| JP | 10-154373 A | 6/1998 |

\* cited by examiner

FIG. 6

| OFFSET | NAME | OPERATION |
|---|---|---|
| 000h | STATE CLEAR | STATE AND CONTROL INFORMATION |
| 004h | STATE SET | SET STATE CLEAR BIT |
| 008h | NODE ID | SHOW NODE ID OF 16 BITS |
| 00Ch | RESET START | START COMMAND RESET |
| 018-01Ch | SPLIT TIME OUT | PRESCRIBE MAXIMUM TIME OF SPLIT |
| 200h | CYCLE TIME | CYCLE TIME |
| 210h | BUSY TIME OUT | PRESCRIBE LIMIT OF RETRY |
| 21Ch | BUS MANAGER | SHOW ID OF BUS MANAGER |
| 220h | BAND AVAILABLE SITUATION | SHOW BAND WHICH CAN BE ALLOCATED TO ISOCHRONOUS COMMUNICATION |
| 224h-228h | CHANNEL AVAILABLE SITUATION | SHOW AVAILABLE SITUATION OF EACH CHANNEL |

FIG. 7

| | |
|---|---|
| 900h | OUTPUT MASTER PLUG REGISTER |
| 904h | OUTPUT PLUG CONTROL REGISTER #0 |
| 908h | OUTPUT PLUG CONTROL REGISTER #1 |
| ⋮ | ⋮ |
| 97Ch | OUTPUT PLUG CONTROL REGISTER #30 |
| 980h | INPUT MASTER PLUG REGISTER |
| 984h | INPUT PLUG CONTROL REGISTER #0 |
| 988h | INPUT PLUG CONTROL REGISTER #1 |
| ⋮ | ⋮ |
| 9FCh | INPUT PLUG CONTROL REGISTER #30 |

FIG. 8A oMPR

| DATA RATE CAPABILITY | BROADCAST CHANNEL BASE | AUXILIARY EXTENDED FIELD | MAIN EXTENDED FIELD | (RESERVED) | NUMBER OF INPUT PLUGS |
|---|---|---|---|---|---|
| 2 | 6 | 8 | 8 | 3 | 5 (BITS) |

FIG. 8B oPCR[n]

| ON-LINE | BROADCAST CONNECTION COUNTER VALUE | P-P CONNECTION COUNTER VALUE | (RESERVED) | NUMBER OF CHANNEL | (RESERVED) | DATA RATE | OVERHEAD ID | PAYLOAD |
|---|---|---|---|---|---|---|---|---|
| 1 | 1 | 6 | 2 | 6 | 2 | 2 | 4 | 10 (BITS) |

FIG. 8C iMPR

| DATA RATE CAPABILITY | (RESERVED) | AUXILIARY EXTENDED FIELD | MAIN EXTENDED FIELD | (RESERVED) | NUMBER OF INPUT PLUGS |
|---|---|---|---|---|---|
| 2 | 6 | 8 | 8 | 3 | 5 (BITS) |

FIG. 8D iPCR[n]

| ON-LINE | BROADCAST CONNECTION COUNTER VALUE | P-P CONNECTION COUNTER VALUE | (RESERVED) | NUMBER OF CHANNEL | (RESERVED) |
|---|---|---|---|---|---|
| 1 | 1 | 6 | 2 | 6 | 16 (BITS) |

| VALUE | MEANING |
|---|---|
| 00h~3Fh | IEC60958 CONFORMAT |
| 40h~4Fh | MULTI-BIT LINEAR AUDIO |
| 50h~57h | 1 BIT AUDIO (RAW DATA) |
| 58h~5Fh | 1 BIT AUDIO (PROCESSED) |
| 60h~7Fh | RESERVED |
| 80h~83h | MIDI CONFORMAT |
| 88h~BFh | SMPTE TIME CODE & SAMPLE COUNT |
| 90h~BFh | RESERVED |
| C0h~EFh | ANCILLAY DATA |
| F0h~FFh | RESERVED |

FIG. 16

| SID | | DBS | | | FN | QPC | Rsv | SYT | | DBC |
|---|---|---|---|---|---|---|---|---|---|---|
| 0 | 0 | | | | | | | | | |
| 1 | 0 | FMT | EVT | SFC | FN | | | | | |
| LABEL (AA) | | AUDIO DATA SUB ID | | | 1 BIT AUDIO STREAM DATA | | | | | |
| LABEL (AA) | | AUDIO DATA SUB ID | | | 1 BIT AUDIO STREAM DATA | | | | | |
| LABEL (AA) | | AUDIO DATA SUB ID | | | 1 BIT AUDIO STREAM DATA | | | | | |
| LABEL (AA) | | AUDIO DATA SUB ID | | | 1 BIT AUDIO STREAM DATA | | | | | |
| LABEL (CC) | | INFORMATION FOR DSD | | | AUDIO INFORMATION | | | | | |

FIG. 19

| SID | | DBS | | FN | QPC | | RESERVED | DBC |
|---|---|---|---|---|---|---|---|---|
| 0 0 | | | | | | | | |
| FMT | EVT | SFC | 0 | FN | | SYT | | |
| 1 0 | 0 | | | | | | | |
| LABEL (BB) | SUB-LABEL (DST) | | | | (DST 1 BIT AUDIO STREAM DATA) | | | |
| LABEL (BB) | SUB-LABEL (DST) | | | | (DST 1 BIT AUDIO STREAM DATA) | | | |
| LABEL (BB) | SUB-LABEL (DST) | | | | (DST 1 BIT AUDIO STREAM DATA) | | | |
| LABEL (BB) | SUB-LABEL (DST) | | | | 1 BIT AUDIO STREAM DATA | | | |
| LABEL (CC) | SUB-LABEL | | | | | | | |

TRANSMISSION METHOD, TRANSMISSION APPARATUS AND TRANSMISSION SYSTEM

This is a continuation of prior application Ser. No. 09/744,429 filed Jun. 13, 2001 now U.S. Pat. No. 6,947,422.

TECHNICAL FIELD

The present invention relates to a transmission apparatus and a transmission method for use in transmitting audio data of various systems to an IEEE (The Institute of Electrical and Electronics Engineers) 1394 system bus line, for example, and a transmission system to which this transmission system is applied.

BACKGROUND ART

A transmission method and a transmission apparatus in which a plurality of AV-devices are connected by a network using an IEEE 1394 system bus line and video data, audio data and other data are transmitted between the above devices have been put into practical use. In the case of the IEEE 1394 system bus line, there are available an isochronous transfer channel for transmitting data of a large capacity such as video data and audio data and an asynchronous transfer channel for transmitting data such as control commands so that these data can be transmitted in the mixed state.

Details of a format for transmitting audio data (music data) by the IEEE 1394 system bus line is disclosed in [Audio and Music Data Transmission Protocol]. This [Audio and Music Data Transmission Protocol] is laid open in 1394 TRADE ASSOCIATION.

Conventional audio data prescribed such that it should be transmitted according to the above format is only general digital audio data in which a sampling frequency is a constant frequency such as a constant frequency of 44.1 kHz and one sample is formed of 16 bits or 24 bits. On the other hand, there have been proposed a variety of new digital audio data formats capable of improving a tone quality of reproduced sounds much more. Various types of multichannel audio data formats capable of reproducing multichannel audio data over 2 channels have been proposed. Hence, there exist a large number of digital audio data formats.

The above IEEE 1394 system bus line, however, cannot take the transmission of audio data of such new format into consideration. Hence, it is difficult to transmit such audio data according to the present format.

When audio data is transmitted, there is a demand that not only audio data itself but also data accompanied with copy control information or the like should be transmitted. The transmission of such accompanying data is not taken into consideration depending upon a format of transmitted audio data. Hence, some countermeasure should be made.

DISCLOSURE OF THE INVENTION

It is an object of the present invention to provide a transmission method, a transmission apparatus and a transmission system in which audio data of various formats can satisfactorily be transmitted by a transmission line such as a bus line.

According to the first invention, in a transmission method of transmitting data having a predetermined data length as a unit between devices for transmitting data through a predetermined transmission line by a predetermined format, label data indicating a system of transmitted audio stream data is located at a starting portion of data having a predetermined data length as a unit, the audio stream data of the system indicated by the label data is located at an interval behind the label data and data is transmitted. With the above arrangement, a system of audio data can be judged by the label data located at the starting portion of each data and hence audio data of various systems can satisfactorily be transmitted by a suitable means such as a bus line.

According to the second invention, in the transmission method of the first invention, data accompanying with the audio stream data of the system indicated by the label data is located at an interval following the label data and audio stream data of a system indicated by the label data is located at a remaining interval. With the above arrangement, the data accompanying with audio data also can be transmitted simultaneously, and hence a reception side can execute control satisfactorily based on the accompanying data.

According to the third invention, in the transmission method of the present invention, located audio stream data is one-bit system audio stream data or data which results from compressing the stream data. With the above arrangement, the one-bit system audio stream data or the data which results from compressing the stream data can satisfactorily be transmitted at the same time data accompanying audio data is being transmitted.

According to the fourth invention, in the transmission method of the first invention, the predetermined format is a format complying with a protocol for transmitting data in an isochronous transfer mode through a transmission line, and a plurality of data having a predetermined data length as a unit are located at an interval following a header prescribed by the protocol. With the above arrangement, audio stream data of various kinds of systems can satisfactorily be transmitted by using a suitable means such as a bus line of a system for transmitting data in an isochronous transfer mode.

According to the fifth invention, in the transmission method of the fourth invention, sub-label data is located at an interval following the label and data accompanying with audio stream data of a system indicated by the label data is located at an interval behind the sub-label data in data of a part of unit within a plurality of data having a predetermined data length as a unit, and audio stream data of a system indicated by the label data is located at an interval following the label of data in data of a remaining unit. With the above arrangement, ancillary data also can be transmitted by a data structure nearly similar to that of audio data and audio data and ancillary data can satisfactorily be transmitted as data located within a packet of one unit.

According to the sixth invention, in the transmission method of the fifth invention, located audio stream data is one-bit system audio stream data or data which results from compressing the stream data. With the above arrangement, the one-bit system audio stream data or the data which results from compressing the stream data can be transmitted satisfactorily.

According to the seventh invention, in the transmission method of the fifth invention, located audio stream data is audio stream data of DVD audio system. With the above arrangement, the audio stream data of the DVD audio system can be transmitted satisfactorily.

According to the eighth invention, in a transmission method of transmitting data having a predetermined data length as a unit between devices for transmitting data through a predetermined transmission line by a predetermined format, label data indicating that data is data which results from compressing digital audio data is located at a starting portion of data having a predetermined data length as a unit as transmitted data, sub-label data indicating the compression system is located at an interval following the label data, audio stream data compressed by a compression system indicated by the sub-label data is located at an interval behind the sub-label data and data is transmitted. With the above arrangement, when the data which results from compressing the digital audio data is transmitted, a transmission of such data can be judged by the label data located at the starting portion of each data, the compression system also can be judged by the sub-label data following the label data and the data which results from compressing the digital audio data can satisfactorily be transmitted by a transmission line of a predetermined format regardless of the compression system.

According to the ninth invention, in the transmission method of the eighth invention, the predetermined format is a format complying with a protocol for transmitting data in an isochronous transfer mode by a transmission line, and a plurality of data having a predetermined data length as a unit are located at an interval following a header prescribed by the protocol. With the above arrangement, data which results from compressing digital audio data can satisfactorily be transmitted by using the transmission line of the system in which data is transmitted in the isochronous transfer mode.

According to the tenth invention, in the transmission method of the ninth invention, label or sub-label indicating that data is ancillary data is located at data of a part of unit of a plurality of data having a predetermined data length and data accompanying with audio stream data is located at an interval behind the label or the sub-label indicating that data is the ancillary data. With the above arrangement, ancillary data also can be transmitted by a data structure nearly similar to that of audio data.

According to the eleventh invention, there is provided a transmission apparatus which is comprised of audio data input means for obtaining audio stream data of a predetermined system, transmission data generating means in which data obtained by the audio data input means is divided into data having a predetermined data length and transmission data of a predetermined format is obtained by locating label data indicating a system of transmitted data at a starting portion of each of divided data, and transmission means for transmitting the transmission data generated by the transmission generating means to a predetermined transmission line. With the above arrangement, a system of audio data can be judged by the label data located at the starting portion of each unit of data transmitted from this transmission apparatus to the transmission line so that audio data of various systems can be transmitted to the transmission line.

According to the twelfth invention, in the transmission apparatus of the eleventh invention, data accompanying with audio stream data of a system indicated by label data is located at a predetermined interval following the label data and audio stream data of a system indicated by the label data is located at a remaining interval as transmission data generated by the transmission generating means. With the above arrangement, data accompanying with audio data also can be transmitted simultaneously, and there can be obtained a transmission apparatus in which a reception side can be controlled based on accompanying data satisfactorily.

According to the thirteenth invention, in the transmission apparatus of the twelfth invention, audio stream data located at the transmission data generated by the transmission data generating means is one-bit system audio stream data or data which results from compressing the stream data. With the above arrangement, the one-bit system audio stream data or the data which results from compressing the stream data can satisfactorily be transmitted from this transmission apparatus while data accompanying with audio data is being transmitted simultaneously.

According to the fourteenth invention, in the transmission apparatus of the eleventh invention, the predetermined format generated by the transmission data generating means is a format complying with a protocol for transmitting data in an isochronous transfer mode by a transmission line and a plurality of data having a predetermined data length as a unit are located at an interval following a header prescribed by the protocol. With the above arrangement, there is obtained a transmission apparatus capable of satisfactorily transmitting audio stream data of various systems by using the transmission line of the system for transmitting data in the isochronous transfer mode.

According to the fifteenth invention, in the transmission apparatus of the fourteenth invention, sub-label is disposed at an interval following the label and data accompanying with audio stream data of a system indicated by the label data is located at an interval behind the sub-label in data of a part of unit within a plurality of data having a predetermined data length as a unit located by transmission data generating means and audio stream data of a system indicated by the label data is located at an interval following the label in the data of the remaining unit. With the above arrangement, ancillary data also can be transmitted by a data structure nearly similar to that of audio data. Hence, there is obtained a transmission apparatus capable of transmitting the audio data and the ancillary data as data located within the packet of one unit.

According to the sixteenth invention, in the transmission apparatus of the fifteenth invention, the audio stream data obtained by the audio data input means and which is located by the transmission data generating means is one-bit system audio stream data or data which results from compressing the stream data. With the above arrangement, there is obtained a transmission apparatus capable of satisfactorily transmitting the one-bit system audio stream data or the data which results from compressing the stream data.

According to the seventeenth invention, in the transmission apparatus of the fifteenth invention, the audio stream data obtained by the audio data input means and which is located by the transmission data generating means is audio stream data of DVD audio system. With the above arrangement, there is obtained a transmission apparatus capable of satisfactorily transmitting the audio stream data of the DVD audio system.

According to the eighteenth invention, there is provided a transmission apparatus which is comprised of audio data input means for obtaining data which results from compressing digital audio data, transmission data generating means in which data obtained by the audio data input means is divided into data having a predetermined data length and transmission data of a predetermined format is obtained by locating label data indicating that transmitted data is data which results from compressing digital audio data and sub-label data indicating the compression system at a starting portion of each divided data and transmission means for transmitting the transmission data generated by the transmission data generating means to a predetermined transmission line. With the above arrangement, when the data which results from compressing the digital audio data is transmitted, the transmission of such data can be judged based on the label data located at the starting portion of each data and the compression system also can be judged based on the sub-label data following the label data. Hence, there is obtained a transmission apparatus capable of satisfactorily transmitting the data which results from compressing the digital audio data by a transmission line of a predetermined format regardless of the compression system.

According to the nineteenth invention, in the transmission apparatus of the eighteenth invention, the predetermined format generated by the transmission data generating means is a format complying with a protocol for transmitting data in an isochronous transfer mode through a transmission line. A plurality of data comprising label data, sub-label data and audio data are located in an interval following a header prescribed by the protocol. With the above arrangement, there is obtained a transmission apparatus capable of satisfactorily transmitting data which results from compressing the digital audio data by using a transmission line of a system for transmitting data in the isochronous transfer mode.

According to the twentieth invention, in the transmission apparatus of the nineteenth invention, label indicating that data is ancillary data is located at a starting portion and data accompanying with digital audio data is located in an interval behind the label data indicating that data is the ancillary data in data of a part of a plurality of data located by the transmission data generating means. With the above arrangement, there is obtained a transmission apparatus capable of transmitting ancillary data by a data structure nearly similar to that of audio data.

According to the twenty-first invention, there is provided a transmission apparatus which is comprised of reception means for receiving data transmitted through a predetermined transmission line, identification means for setting data received by said reception means to data having a predetermined data length as a unit and which identifies label data located at a starting portion of each unit and audio data processing means for judging a system of audio stream data located at an interval following the label data based on identified results of the identification means and which executes audio data processing based on judged results. With the above arrangement, the system of audio data can be judged by the label data located at the starting portion of each unit of the received data.

According to the twenty-second invention, in the transmission apparatus of the twenty-first invention, the identification means also identifies data accompanying with audio stream data located at a predetermined interval following the label data. With the above arrangement, the data accompanying with the audio data can be received simultaneously and audio data received based on the accompanying data can be processed properly.

According to the twenty-third invention, in the transmission apparatus of the twenty-second invention, it is judged based on the identified results of the identification means that the received audio stream data is one-bit system audio stream data or data which results from compressing the stream data. With the above arrangement, the audio stream data or the data which results from compressing the stream data can be received at the same time the data accompanying with the audio data is received.

According to the twenty-fourth invention, in the transmission apparatus of the twenty-first invention, the identification means identifies audio stream data from data comprising a plurality of data having a predetermined data length as a unit in the interval following a header prescribed by a protocol for transmitting data in the isochronous transfer mode by a transmission line. With the above arrangement, it becomes possible to satisfactorily receive and process audio stream data of various systems by using the transmission line of the system in which data is transmitted in the isochronous transfer mode.

According to the twenty-fifth invention, in the transmission apparatus of the twenty-fourth invention, the identification means identifies sub-label data of the interval following the label from data of a part of unit in which there are located a plurality of data having a predetermined data length as a unit. When the identification means identifies the sub-label data, data accompanying with audio stream data is detected from data of an interval behind the sub-label data. With the above arrangement, ancillary data also can be received by a data structure nearly similar to that of audio data so that audio data and ancillary data can be received as data within the packet of one unit.

According to the twenty-sixth invention, in the transmission apparatus of the twenty-fifth invention, it is identified by the identification means based on label data or sub-label data that one-bit system audio stream data or data which results from compressing the stream data is received. With the above arrangement, one-bit system audio stream data or the data which results from compressing the stream data can be received satisfactorily.

According to the twenty-seventh invention, in the transmission apparatus of the twenty-fifth invention, it is identified by the identification means based on label data or sub-label data that audio stream data of DVD system is received. With the above arrangement, the audio stream data of the DVD audio system can be received satisfactorily.

According to the twenty-eighth invention, there is provided a transmission apparatus which is comprised of a reception means for receiving data transmitted through a predetermined transmission line, identification means for setting data received by the reception means to data having a predetermined data length as a unit and which identifies label data and sub-label data located at a starting portion of each unit and audio data processing means for judging a compression system of audio stream data located at an interval following label data based on identified result of sub-label data from the identification means and which processes audio data based on a judged system. With the above arrangement, when data which results from compressing digital audio data is received, it can be judged based on the label data located at the starting portion of each data that data is compressed data, a compression system also can be judged based on the sub-label data following the label data, and data which results from compressing digital audio data can satisfactorily be received and processed regardless of the compression system.

According to the twenty-ninth invention, in a transmission system in which data having a predetermined data length as a unit is transmitted between a first device and a second device for transmitting data through a predetermined transmission line by a predetermined format, this transmission system includes audio data input means for obtaining audio stream data of a predetermined system, transmission data generating means in which data obtained by the audio data input means is divided into data having a predetermined data length and transmission data of a predetermined format is obtained by locating label data indicating a system of transmitted data at a starting portion of each divided data and transmission means for transmitting the transmission data generated by the transmission data generating means to a transmission line as the first device and includes reception means for receiving data transmitted through a transmission line, identification means for setting the data received by the reception means to data having a predetermined data length as a unit and which identifies label data located at a starting portion of each unit and audio data processing means for judging a system of audio stream data located at an interval following label data based on identified results of the identification means and which processes audio data based on the judged system as the second device. With the above arrangement, the system of audio data can be judged based on the label data located at the starting portion of data of each unit transmitted by a transmission line. Hence, it becomes possible to transmit audio data of various systems by a transmission line.

According to the thirtieth invention, in the transmission system of the twenty-ninth invention, the transmission data generating means of the first device locates sub-label data and data accompanying with audio stream data in addition to the label data and the identification means of the second device detects the data accompanying with the audio stream data if it identifies the sub-label. With the above arrangement, the data accompanying with the audio stream data can be transmitted satisfactorily.

BRIEF DESCRIPTION OF DRAWINGS

FIG. 6 is an explanatory diagram showing examples of positions, names and operations of major CRSs.

FIG. 7 is an explanatory diagram showing an example of an arrangement of a plug control register.

FIG. 8 is an explanatory diagram showing examples of arrangements of oMPR, oPCR, iMPR, iPCR.

FIG. 11 is an explanatory diagram showing an example of an arrangement of a header of transmission data according to an embodiment of the present invention.

FIG. 13 is an explanatory diagram showing an example of data of label data according to an embodiment of the present invention.

FIG. 16 is an explanatory diagram showing an example of an arrangement of the whole of data used when one-bit system audio stream data is transmitted according to an embodiment of the present invention.

FIG. 19 is an explanatory diagram showing an example of an arrangement of the whole of data used when compressed audio data is transmitted.

BEST MODE FOR CARRYING OUT THE INVENTION

An embodiment according to the present invention will be described below with reference to the accompanying drawings.

Figure 1:
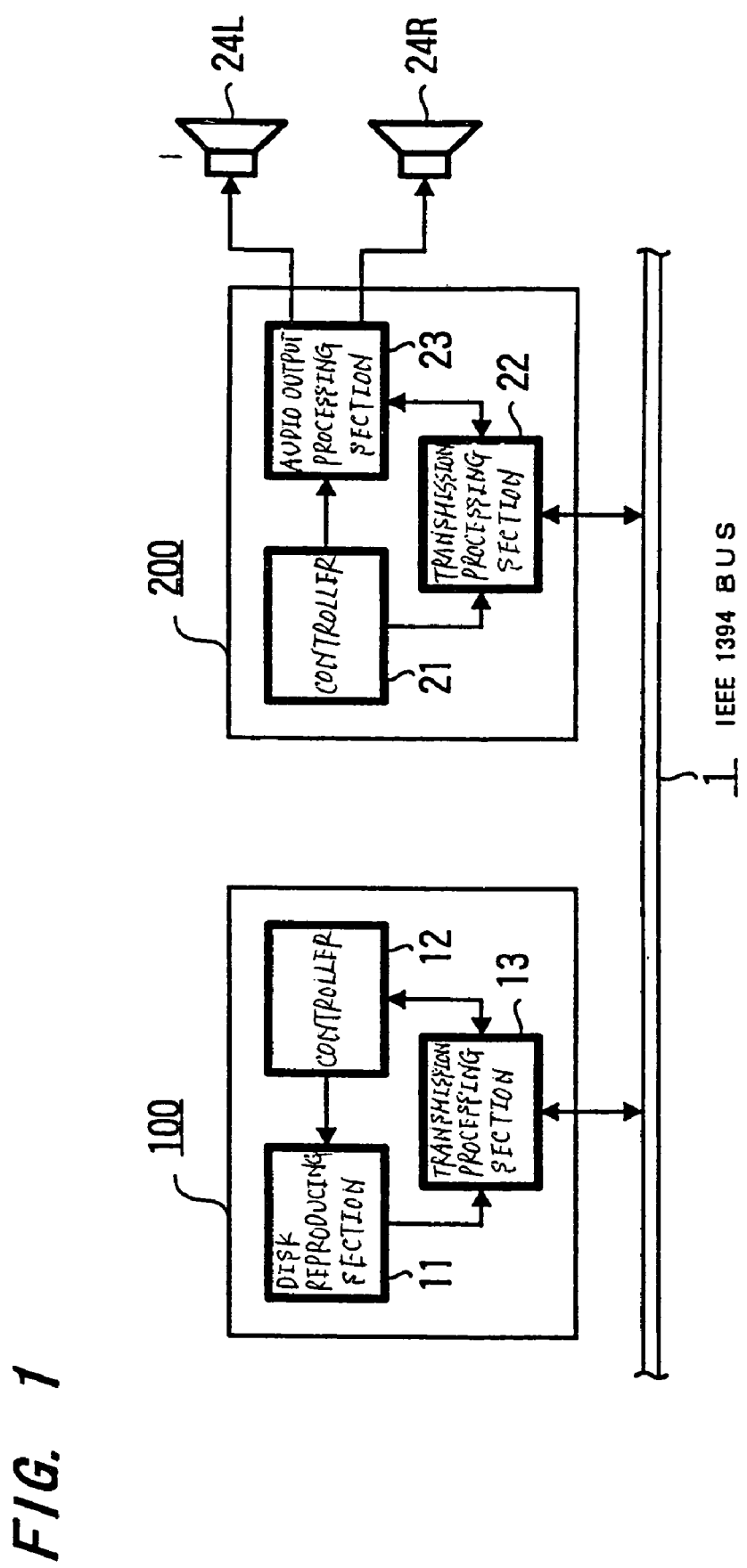
FIG. 1 is a block diagram showing an example of an arrangement of the whole of the system according to an embodiment of the present invention.

First, an example of an arrangement of a network system to which the present invention can be applied will be described with reference to FIG. 1. This network system includes a plurality of devices connected thereto through an IEEE 1394 system serial data bus serving as a digital communication control bus (this bus will hereinafter be simply referred to as a "bus"). FIG. 1 shows an example in which two AV-devices 100, 200 are connected through a bus 1. Devices connected to the bus 1 are those including terminals by which they can be connected to the IEEE 1394 system bus, respectively.

Herein, a audio reproducing apparatus 100 capable of reproducing a digital audio disk (optical disk) called a compact disc (CD) and an audio amplifying apparatus 200 capable of outputting digital audio data transmitted from the audio reproducing apparatus 100 are connected to the bus 1.

The audio reproducing apparatus 100 includes a disk reproducing section 11, a controller 12 for controlling the disk reproduction of this disk reproducing section 11 and a transmission processing section 13 for transmitting digital audio data reproduced by the disk reproducing section 11 to the bus 1. This transmission processing section 13 executes transmission processing under control of the controller 12.

Disks that can be reproduced by the audio reproducing apparatus 100 according to this embodiment are not limited to the compact disc (CD) of the above ordinary format, and a super-audio CD (hereinafter referred to as a "SACD") on which sound of higher quality is recorded can be reproduced. Specifically, on the ordinary CD, there is recorded digital audio data in which a sampling frequency Fs is about 44.1 kHz and one sample is formed of 16 bits per channel. On the other hand, audio data recorded on the SACD is data of one-bit system audio stream data of DSD (Direct Stream Digital) system in which a sampling frequency is a very high frequency (e.g., frequency which is 64 times as high as the sampling frequency Fs of the ordinary CD). Data of this DSD system is recorded on the SACD as data compression-coded by a coding system called a DST (Direct Stream Transfer) system, which is a system with no loss.

As the SACD, there are available a disc having a two-layer structure which includes not only a recording layer of high tone quality audio data compressed by the above DST system but also an audio data recording layer of the ordinary CD.

The audio amplifying apparatus 200 includes a controller 21 for controlling operation within this apparatus, a transmission processing section 22 for receiving and processing data transmitted by the bus 1 and an audio output processing section 23 for effecting processing such as demodulation, analog-conversion and amplification on audio data received at the transmission processing section 22, and analog audio signals outputted from the audio output processing section 23 are supplied to left and right 2-channel speaker apparatus 24L, 24R from which the analog audio signals are emanated. In this case, the audio output processing section 23 is configured such that it can convert digital audio data reproduced from the ordinary CD into analog audio signals, demodulate audio data, compressed by the DST system as the above SACD, and convert demodulated audio data into analog audio signals.

Figure 2:
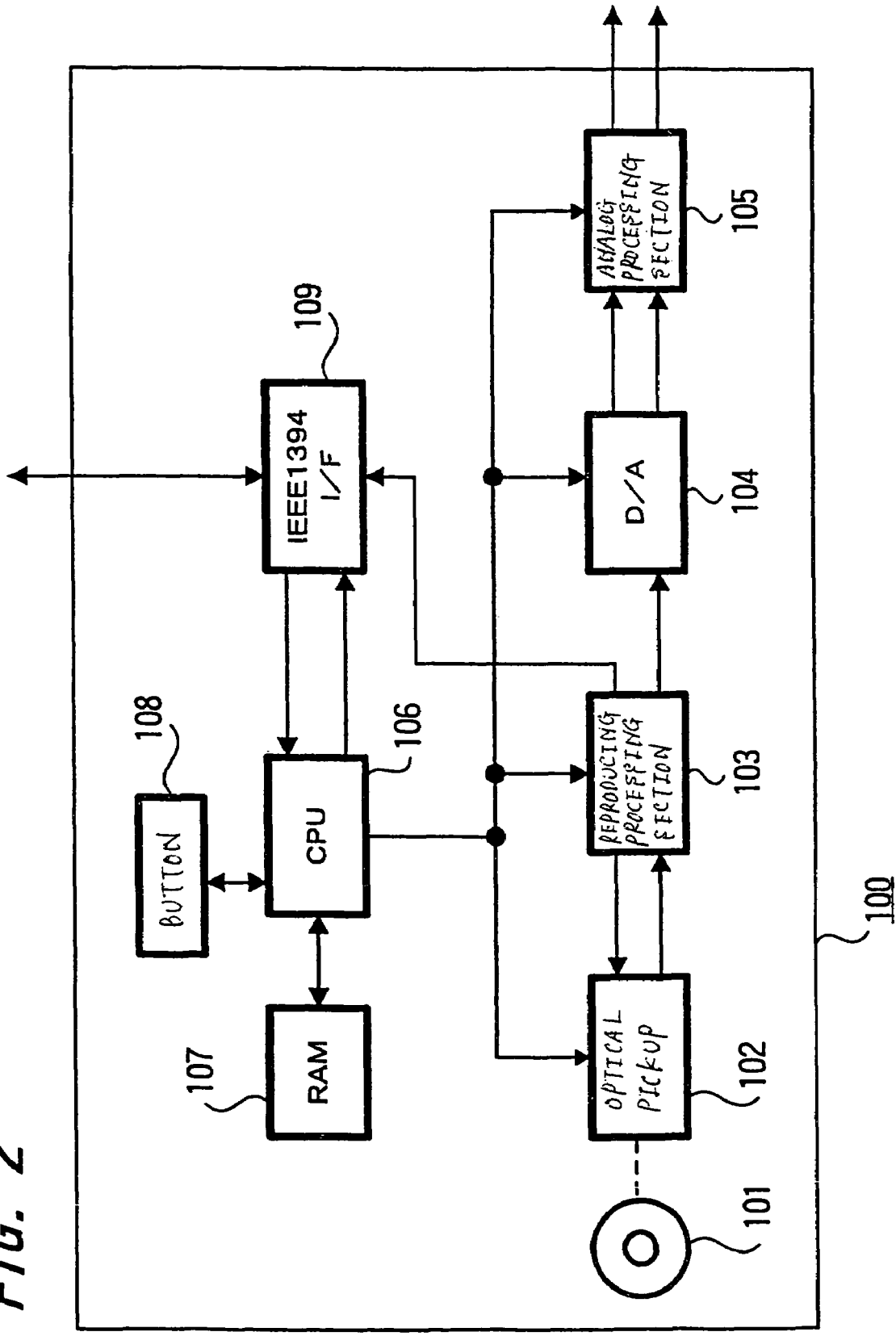
FIG. 2 is a block diagram showing an example of an arrangement of an audio reproducing apparatus.

FIG. 2 is a block diagram showing an example of the audio reproducing apparatus 100 in concrete. An optical pickup 102 reads out data from a disk (optical disk) 101 and a reproduction processing section 103 effects reproduction processing on the data thus read to provide reproduced digital audio data. This reproduced audio data is supplied to a digital-to-analog converter 104, in which it is converted into 2-channel analog audio signals. The analog audio signals thus converted are processed in an analog fashion such as an amplifying process by an analog processing section 105 and then outputted from analog output terminals (not shown) to the outside.

This audio reproducing apparatus further includes an interface section 109 for connecting it to the IEEE 1394 system bus. Hence, audio data played back from the disk 101 can be supplied from the reproduction processing section 103 to the interface section 109 and thereby transmitted to the IEEE 1394 system bus side.

The reproduction processing in the audio reproducing apparatus 100 and the transmission processing through the interface section 109 are executed under control of a central processing unit (CPU) 106. A memory 107 serving as a RAM for work area is connected to the CPU 106. Operating information from a button 108 disposed on the operating panel is supplied to the CPU 106, which may control operation in response to the operating information. Further, when the interface section 109 receives data for controlling the operation of this device through the IEEE 1394 system bus, received data is supplied to the CPU 106 so that the CPU 106 can execute corresponding operation control. The disk reproducing section 11 in the audio reproducing apparatus 100 shown in FIG. 1 corresponds to the reproducing section such as the optical pickup 102 and the reproduction processing section 103. The controller 12 corresponds to the CPU 106, and the transmission processing section 13 corresponds to the interface section 109.

Figure 3:
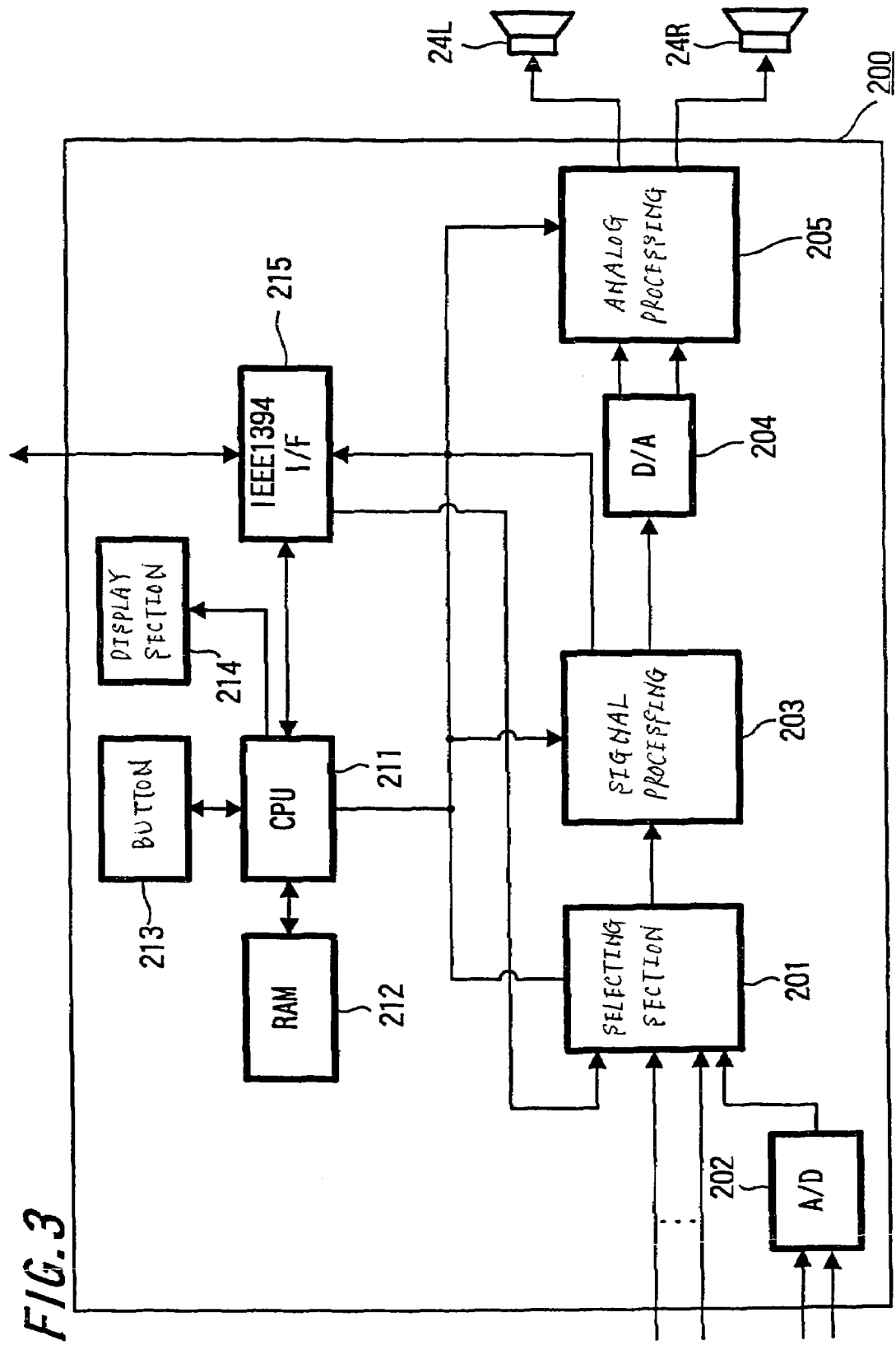
FIG. 3 is a block diagram showing an example of an arrangement of an audio amplifying apparatus.

FIG. 3 is a block diagram showing an example of the audio amplifying apparatus 200 in concrete. The audio amplifying apparatus 200 includes therein a selecting section 201 and the selecting section 201 selects inputted audio data. The selecting section 201 may be supplied with audio signals of a plurality of systems from the outside. When an inputted signal is an analog signal, such analog inputted signal is converted into digital data by an analog-to-digital converter 202 and supplied to and selected by the selecting section 201. Audio data received at the interface section 215 connected to the IEEE 1394 system bus line also can be supplied to and selected by the selecting section 201. A central processing unit 211 controls the selection at the selecting section 201 based on operation of a button 213, which will be described later on, or the like.

The audio data selected by the selecting section 201 is supplied to a signal processing section 203, in which it is processed in a manner suitable for audio reproduction. For example, the processing suitable for audio reproduction is an adjustment of a tone quality, a reverberation processing, or the like.

The audio data processed by the signal processing section 203 is supplied to a digital-to-analog converter 204, in which it is converted into analog audio signals. The analog audio signals thus converted are supplied to an analog processing section 205, in which they are processed in an analog processing fashion such as being amplified so as to drive speakers. The processed audio signals are supplied to speaker apparatus 24L, 24R connected to this audio amplifying apparatus 200. While only the two speaker apparatus are connected to the audio amplifying apparatus by way of example, when multichannel audio data are reproduced, speaker apparatus the channel number of which corresponds to the multichannel audio data may be connected to the audio amplifying apparatus. When there exists a channel exclusively used to reproduce an audio signal having a low frequency, a speaker apparatus called a super woofer capable of reproducing audio signals having low frequencies may be connected to the audio amplifying apparatus.

The audio data processed by the signal processing section 203 may be transmitted through the interface section 215 to the IEEE 1394 system bus line.

The audio processing at the audio amplifying apparatus 200 and the transmission processing through the interface section 215 are executed under control of the central processing unit (CPU) 211. A memory 212 serving as a RAM for work area is connected to the CPU 211. Operating information from a button 213 disposed on an operating panel is supplied to the CPU 211 which controls operation corresponding to the operating information. Status such as the inputted signal selected state and the tone quality adjusted state may be displayed in the form of characters and graphic symbols by a display section 214 connected to the CPU 211. Further, when the interface section 215 receives data for controlling operation of this device through the IEEE 1394 system bus, the received data is supplied to the CPU 211 and the CPU 211 can control the corresponding operation. The controller 21 in the audio amplifying apparatus 200 shown in FIG. 1 corresponds to the CPU 211, the audio output processing section 22 corresponds to the circuits such as the selecting section 201 and the signal processing section 203, and the transmission processing section 23 corresponds to the interface section 215.

The respective devices 100, 200 connected to the bus 1 are referred to as a "unit". With commands prescribed by the AV/C Digital Interface Command Set General specification (AV/C command) of the AV/C command Transaction Set, one device can control another device by reading and writing information stored in the respective units.

The respective units (devices 100, 200) connected to the bus 1 are called "nodes" (node) on the network. Node IDs are set to respective units, and a data transmission source and a data reception destination on the network can be specified by the node ID. If it is detected that a new device is connected to the bus 1 or that a connected device is disconnected from the bus, then a bus reset occurs and the processing for setting the node ID again should be executed. Accordingly, when the bus reset occurs, the node IDs set to the respective devices may be changed.

Next, the manner in which data is transmitted through the IEEE 1394 system bus 1 to which the respective devices 100, 200 are connected will be described.

Figure 4:
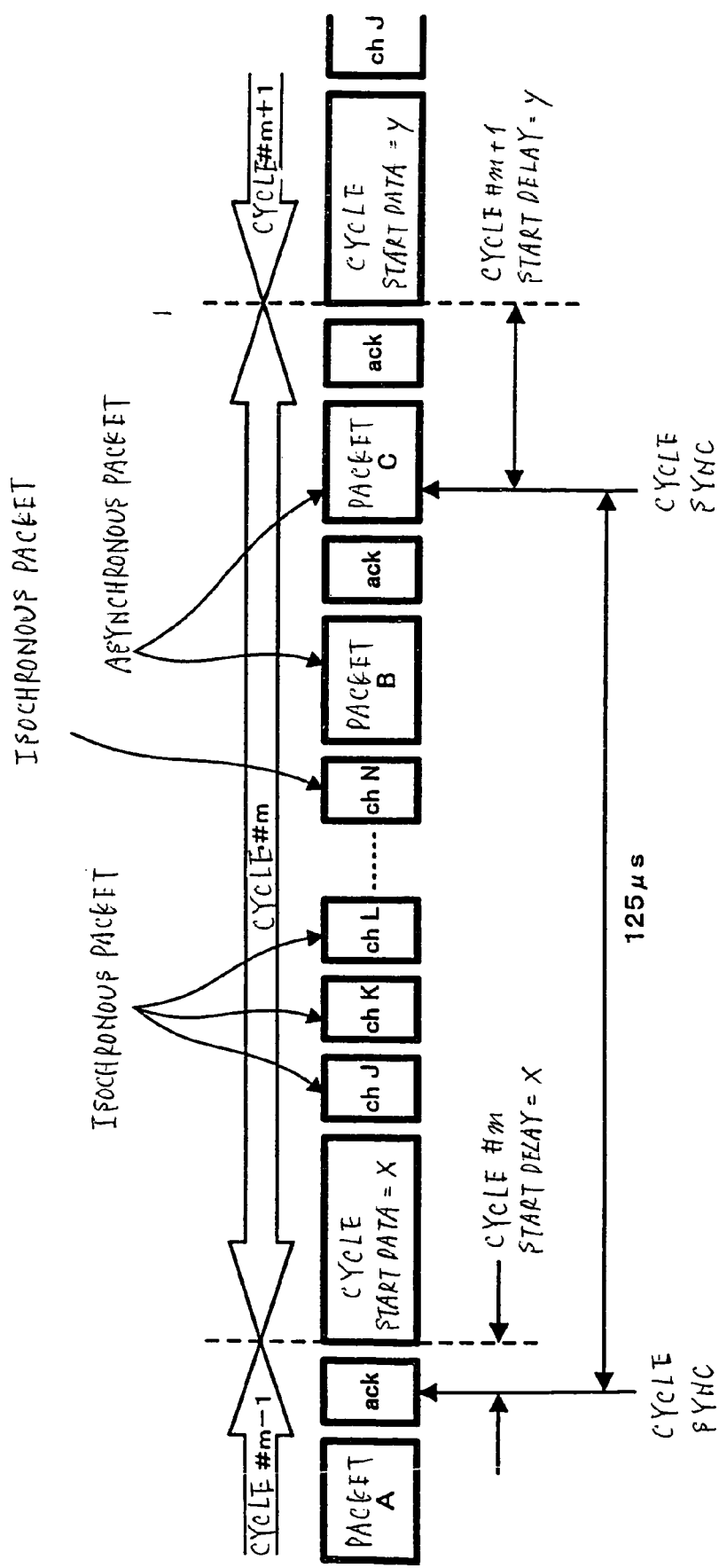
FIG. 4 is an explanatory diagram showing an example of a frame structure prescribed by the IEEE 1394 system.

FIG. 4 is a diagram showing a data transmission cycle structure of a device connected via the IEEE 1394. According to the IEEE 1394, data is divided into packets and transmitted in a time-division manner based on a cycle of a duration of 125 μS. This cycle is created by a cycle start signal supplied from a node having a cycle master function (any device connected to the bus). An isochronous packet secures a band necessary for transmission (referred to as a "band" although it is a time unit) from the start of all cycles. Accordingly, in the isochronous transmission, the transmission of data within a constant time can be assured. However, if a transmission error occurs, then data will be lost because this data transmission cycle structure has no mechanism for protecting data from the transmission error. In the asynchronous transmission in which a node, which secures a bus as a result of arbitration in a time which is not used in the isochronous transmission of each cycle, transmits the asynchronous packet, although a reliable transmission is assured by using acknowledge and retry, a transmission timing cannot be made constant.

When a predetermined node transfers data in the isochronous transfer mode, such node has to be corresponding to the isochronous function. At least one of the nodes corresponding to the isochronous function has to have a cycle master function. Further, at least one of the nodes connected to the IEEE 1394 serial bus has to have an isochronous resource manager function.

Figure 5:
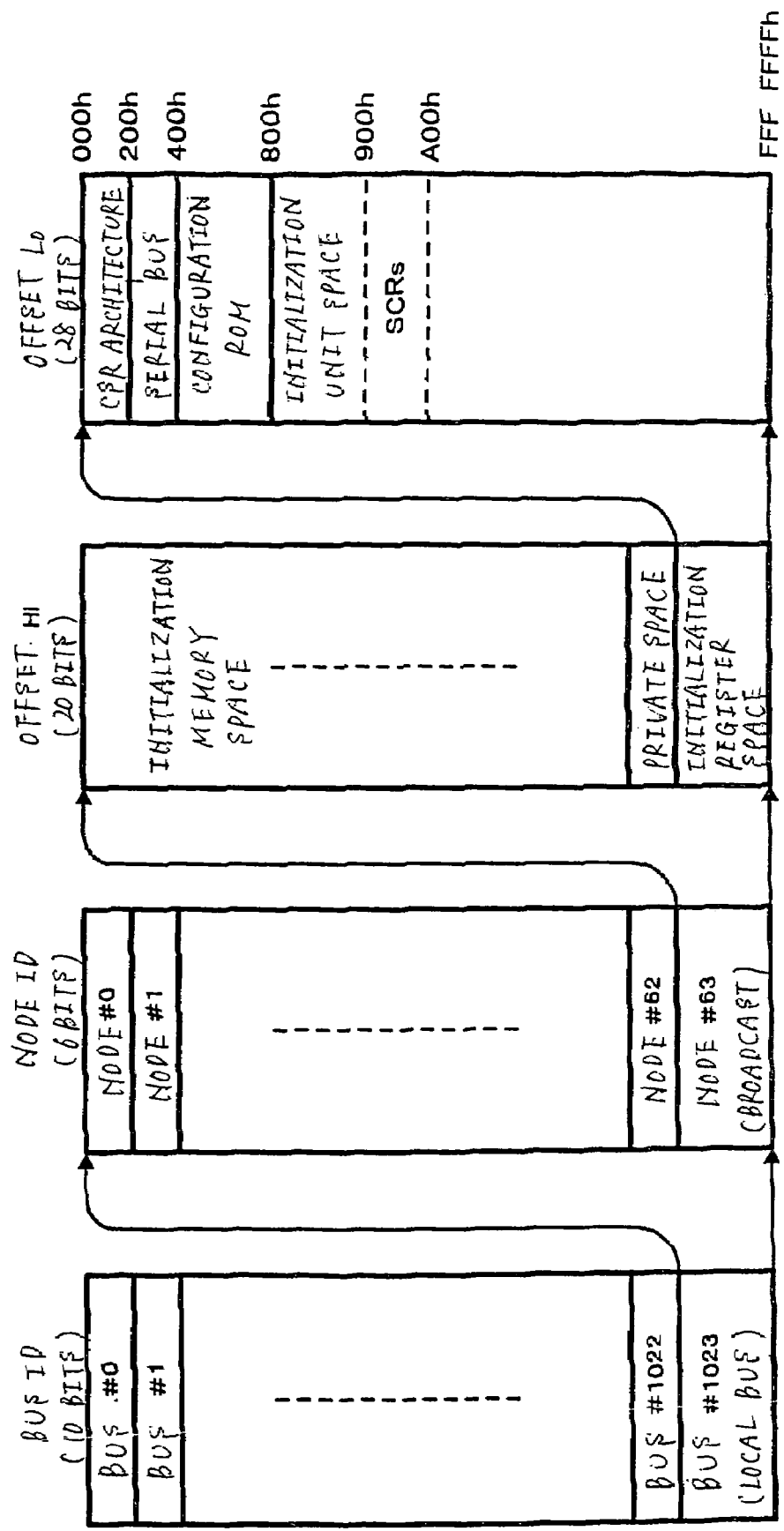
FIG. 5 is an explanatory diagram showing an example of an address space structure of a CRS architecture.

The IEEE 1394 is based on a CSR (Control & Status Register) architecture having 64-bit address space prescribed by the ISO/IEC 13213. FIG. 5 is a diagram to which reference will be made in explaining a structure of a CSR architecture address space. High-order 16 bits represent a node ID indicative of a node on each IEEE 1394, and remaining 48 bits are used to designate an address space given to each node. The high-order 16 bits are separated into 10 bits of a bus ID and 6 bits of a physical ID (node ID in a narrow sense). Values in which all bits go to 1 are for use as a special purpose, and hence 1023 buses and 63 nodes can be designated. The node ID should be set again when the bus reset occurs. The bus reset occurs when the arrangement of the device connected to the bus 1 is changed. For example, when any one of devices connected to the bus is disconnected or when a new device is connected to the bus 1, the bus reset is executed.

A space prescribed by high-order 20 bits of 256-terabyte address space prescribed by low-order 48 bits is separated into an initial register space for use as a register unique to 2048-byte CSR, a register unique to the IEEE 1394, or the like, a private space and an initial memory space. A space prescribed by low-order 28 bits are for use as a configuration ROM (Configuration read only memory), an initial unit space for use unique to a node and plug control register (PCRS) if a space prescribed by its high-order 20 bits is the initial register space.

FIG. 6 is a diagram to which reference will be made in explaining offset addresses, names and operation of major CSRs. The offset in FIG. 6 indicates an offset address from FFFFF0000000h (numerals with h represent a hexadecimal notation) from which the initial resister space begins. A bandwidth available register (Bandwidth Available Register) having an offset 220h represents a band which can be allocated to the isochronous communication, and only a value of node which is being operated as an isochronous resource manager is made effective. Specifically, although each node includes the CSR shown in FIG. 5, only the bandwidth available register of the isochronous resource manager is made effective. In other words, only the isochronous resource manager includes the bandwidth available register substantially. The bandwidth available register preserves a maximum value when the band is not allocated to the isochronous communication and its value decreases each time the band is allocated to the isochronous communication.

A channel available register of offsets 224h to 228h has bits respectively corresponding to channel numbers from channel 0 to channel 63. If the bit is 0, then this shows that the corresponding channel is already allocated. Only the channel available register of the node which is being operated as the isochronous resource manager is effective.

Referring back to FIG. 5, a configuration ROM based on a general ROM (read only memory) format is located at addresses 200h to 400h within the initial register space. Bus info block, root directory and unit directory are located at the configuration ROM. An ID number indicative of vender of devices is stored in a company ID within the bus info block. A unique ID unique to the device is stored in a chip ID.

In order to control input and output of the device through the interface, the node includes a PCR (Plug Control Register), prescribed by the IEC 1833, at addresses 900h to 9FFh within the initial unit space shown in FIG. 5. This is a substantiation of a concept of a plug in order to form a signal channel similar to an analog interface from a logical standpoint. FIG. 7 is a diagram to which reference will be made in explaining the arrangement of the PCR. The PCR includes an oPCR (output Plug Control Register) expressing an output plug and an iPCR (input Plug Control Register) expressing an input plug. The PCR also includes registers oMPR (output Master Plug Register) and iMPR (input Master Plug Register) indicating information of the output plug or the input plug proper to each device. Each device cannot include a plurality of oMPRs and iMPRs but can include a plurality of oPCRs and iPCRs corresponding to individual plugs depending upon a device capability. The PCR shown in FIG. 7 includes 31 oPCRs and iPCRs. The flow of isochronous data can be controlled by operating registers corresponding to these plugs.

FIG. 8 is a diagram showing arrangements of the oMPR, the oPCR, the iMPR and the iPCR. FIG. 8A shows the arrangement of the oMPR, FIG. 8B shows the arrangement of the oPCR, FIG. 8C shows the arrangement of the iMPR and FIG. 8D shows the arrangement of the iPCR, respectively. A code indicative of a maximum transfer speed of isochronous data that the device can transmit or receive is stored in the 2-bit data rate capability on the MSB side of the oMPR and the iMPR. A broadcast channel base of the oMPR prescribes the channel number for use with the broadcast output.

The number of the output plugs of the device, i.e., the value indicative of the number of the oPCRs is stored in the number of the output plugs of 5 bits on the LSB side of the oMPR. The number of the input plugs of the device, i.e., the value indicative of the number of the iPCRs is stored in the number of the input plugs of 5 bits on the LSB side of the iMPR. A main extended field and an auxiliary extended field are the areas defined for future extension.

An on-line on the MSB of the oPCR and the iPCR shows the state in which the plug is in use. Specifically, if its value is 1, then it is indicated that the plug is on-line. If its value is 0, then it is indicated that the plug is off-line. A value of the broadcast connection counter of the oPCR and the iPCR expresses whether the broadcast connection exists (1) or not (0). A value that a point-to-point connection counter having a 6-bit width of the oPCR and the iPCR expresses the number of point-to-point connection of the plug. The point-to-point connection (so-called p-to-p connection) is a connection used to transmit data among one specified node and another specified node.

A value of a channel number having a 6-bit width of the oPCR and the iPCR expresses the isochronous channel number to which the plug is connected. A value of a data rate having a 2-bit width of the oPCR expresses a real transmission speed of packets of the isochronous data outputted from the plug. A code stored in an overhead ID having a 4-bit width of the oPCR expresses a band width of the overhead of the isochronous communication. A value of a payload having a 10-bit width of the oPCR expresses a maximum value of data contained in the isochronous packets that the plug can handle.

Figure 9:
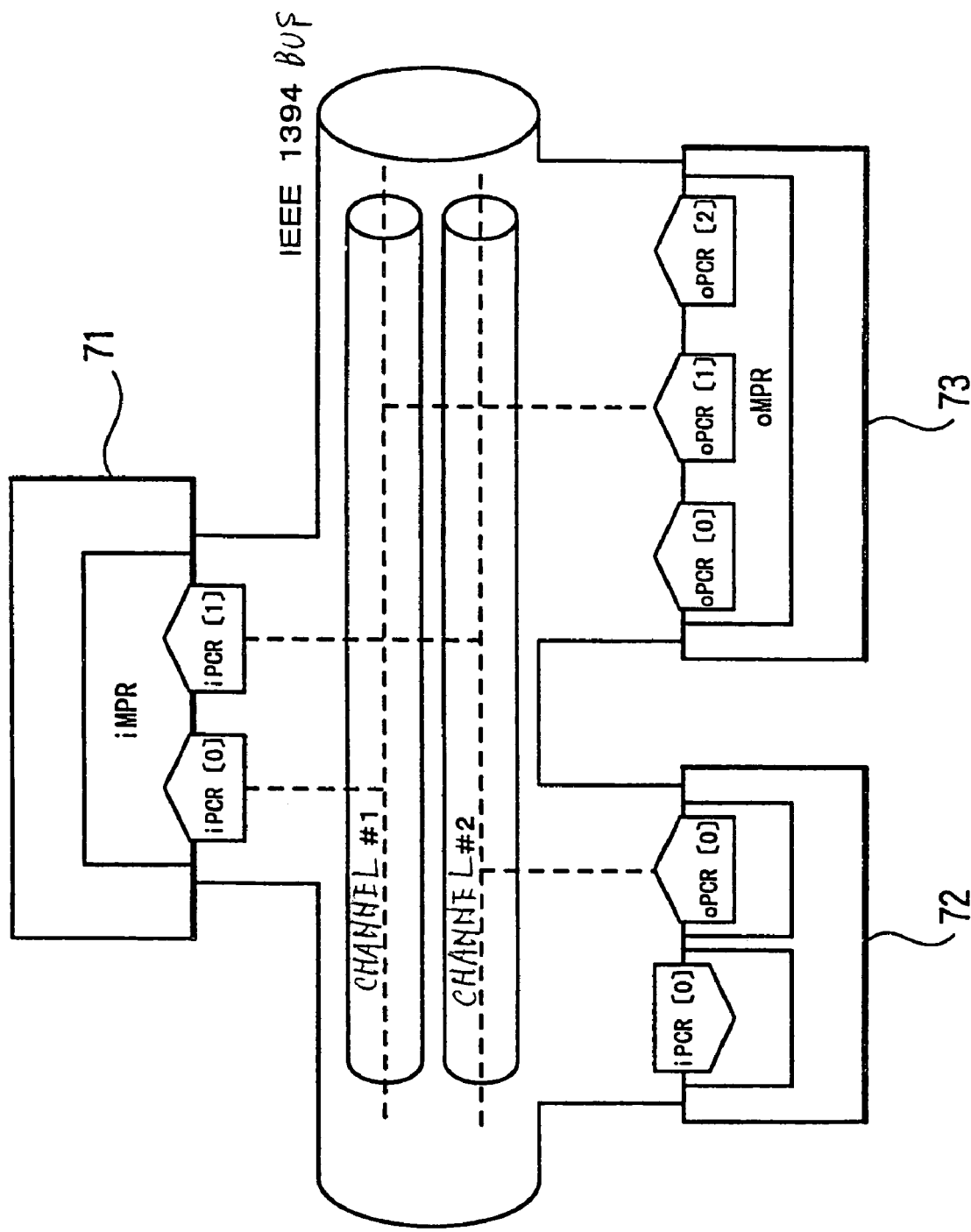
FIG. 9 is an explanatory diagram showing an example of a relationship among plugs, plug control registers and transmission channels.

FIG. 9 is a diagram showing a relationship among the plug, the plug control register and the isochronous channel. Devices connected to the IEEE 1394 system bus are shown as AV devices 71 to 73. Isochronous data whose channel was designated by the oPCR [1] of the oPCR [0] to the oPCR [2] in which the transmission speed and the number of the oPCRs are prescribed by the oMPR of the AV device 73 is transmitted to the channel #1 of the IEEE 1394 serial bus. Based on the transmission speed of the inputted channel #1 and the iPCR [0] of the iPCR [0] and the iPCR [1] in which the transmission speed and the number of the iPCRs are prescribed by the iMPR of the AV device 71, the AV device 71 reads the isochronous data transmitted to the channel #1 of the IEEE 1394 serial bus. In a like manner, the AV device 72 transmits isochronous data to the channel #2 designated by the oPCR [0], and the AV device 71 reads the isochronous data from the channel #2 designated by the iPCR [1].

In this manner, data is transmitted among the devices connected by the IEEE 1394 serial bus.

Figure 10:
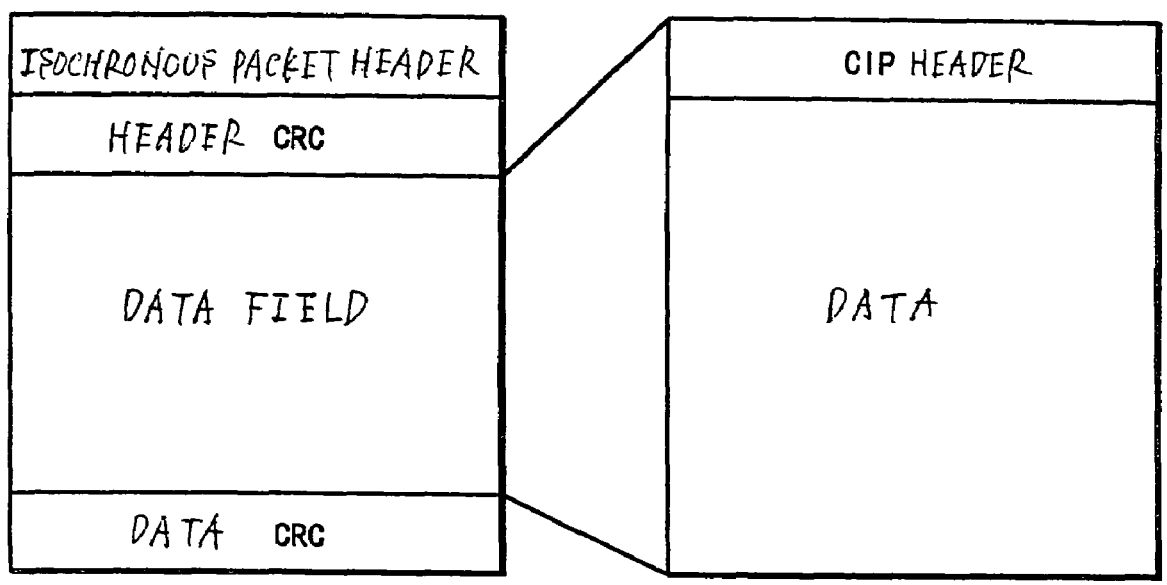
FIG. 10 is an explanatory diagram showing an arrangement of an isochronous transfer mode packet.

Next, a data arrangement used when audio data of a high tone quality compressed by the DST system and which is reproduced from the SACD by the audio reproducing apparatus 100 is transmitted through the above IEEE 1394 serial bus to the audio amplifying apparatus 200 and reproduced from the speaker apparatus 24L, 24R connected to the amplifying apparatus 200 will be described with reference to FIG. 10 and the following sheets of drawings.

When audio data is transmitted through the bus 1, the isochronous packet, which has been described so far with reference to FIG. 4, is transmitted by using an arbitrary channel in the isochronous transfer mode. FIG. 10 is a diagram showing an arrangement of an isochronous packet of one unit. An isochronous packet header of one quadlet interval is located at a starting portion, a header CRC (Cyclic Redundancy Check) serving as an error-detecting code for a header is located at the next one quadlet interval and the following interval is set to the data field. A data CRC serving as an error-detecting code for data is located at the last one quadlet interval. One quadlet is formed of 32 bits (i.e., 8 bits (4), and data is transmitted at the unit of one quadlet.

When audio data is transmitted during the interval of the data field, a CIP (Common Isochronous Packet) header is located at the 2-quadlet interval, and audio data or the like is located at the remaining interval. The CIP header is a header indicative of an attribute of data and has an arrangement shown in FIG. 11. This CIP header portion has an arrangement common to that used when other data such as video data are transmitted in the isochronous transfer mode fundamentally.

Figure 11:
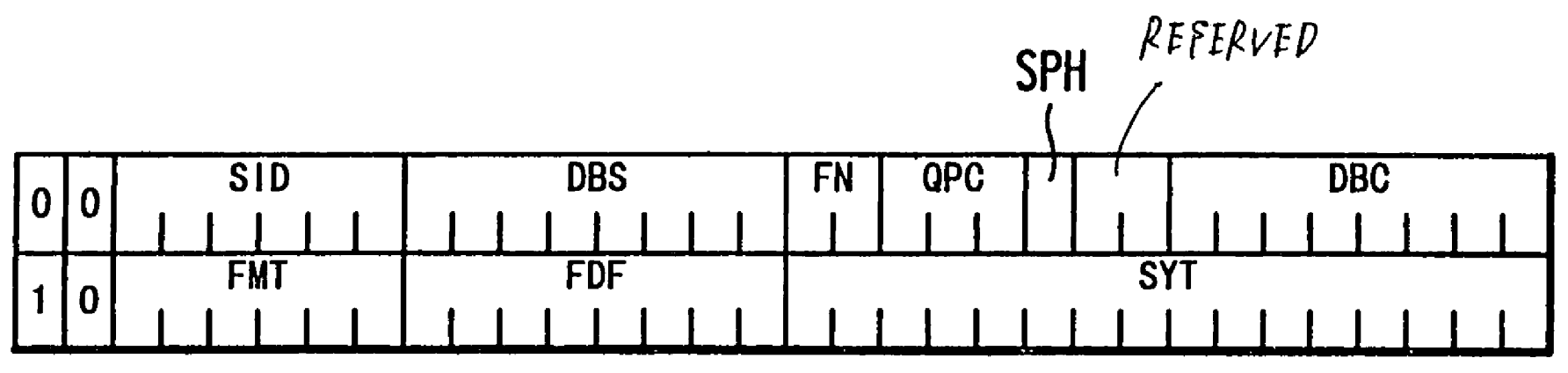

Data located as the CIP header shown in FIG. 11 will be described. A 6-bit SID is a source node ID (Source node ID) and shows a node ID which transmits packets. An 8-bit DBS is a data block size (Data Block Size) and shows a size of divided one data block. A 2-bit FN is a fraction number (Fraction Number) and shows a fraction number in which one source packet is divided into data blocks. A 3-bit QPC is a quadlet padding count (Quadlet Padding Count) and shows the number of quadlets which are added to divide data at the unit of packet. A one-bit SPH is a source packet header (Source Packet Header) and shows whether or not the source-packet header is added to data. An 8-bit DBC is a data block count (Data Block Count) and used as a continuous counter of data block to detect a drop of a packet or the like. A 6-bit FMT is a format ID (Format ID) and shows a format of data of a packet.

The 24 bits following the FMT are set to an FDF (Format Dependent Field) which is a format dependent field in which SYT (Sync Time) which is synchronizing data is located at 16 bits. The SYT is the field which is used to insert time information for use in synchronization in order to synchronize data when data is transmitted and received. The unit of time is based on a cycle counter, for example. Null data is located at the reserved interval.

In the case of this embodiment, data in the FMT interval shows that data is audio data (music data). Data in the FDF interval shows a format which prescribes the audio data. Herein, data in the FDF interval shows it is audio data prescribed by any format of the formats prescribed by the AM824 system.

Figure 12:
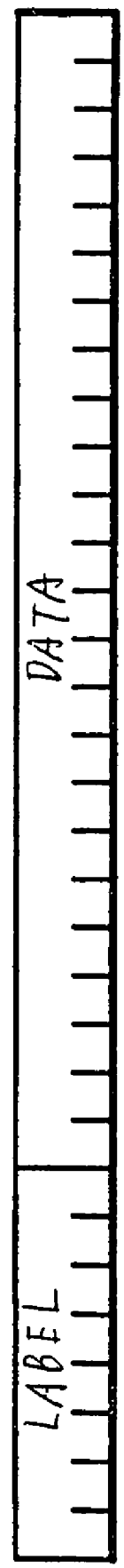
FIG. 12 is an explanatory diagram showing an example of an arrangement of transmission data according to an embodiment of the present invention.

Data following this CIP header portion has an arrangement in which data of 32 bits (1-quadlet) shown in FIG. 12 is repeated a predetermined number of times. A first 8-bit interval within this 32-bit data is allocated to label [LABEL] data, and audio data or the like is located at a 24-bit interval following the label [LABEL]. When audio data of the ordinary CD is transmitted, audio data of one sample is located by using 16 bits of this 24 bits.

In the case of this embodiment, label [LABEL] data is defined as shown in FIG. 13. The value of 8-bit label data is shown by a hexadecimal notation of two digits (a value indicated by adding h). As the meanings defined herein, there are defined as follows.

A value which falls within a range of from "00h" to "3Fh" shows that data is digital audio data [IEC60958 Conformat] which is defined by the IEC60958 standard.

A value which falls within a range of from "40h" to "4Fh" shows that data is multibit linear audio data.

A value which falls within a range of from "50h" to "57h" shows that data is one-bit system audio stream data [One Bit Audio Stream] and which is audio data [Plain] which is not processed.

A value which falls within a range of from "58h" to "5Fh" shows that data is one-bit system audio stream data and which is audio data (Encoded) that has already been processed.

A value which falls within a range of from "80h" to "83h" shows that data is MIDI data [MIDI Conformat].

A value which falls within a range of from "88h" to "8Fh" shows that data are a time code and a sample count standardized by the SMPTE (Society of Motion Picture and Television Engineers).

A value which falls within a range of from "C0h" to "EFh" shows that data is ancillary data [Ancillary Data].

Other values are reserved.

A value which falls within a range of from "48h" to "4Fh" of the multibit linear audio data which falls within the range of from "40h" to "4Fh" can be used to show that data is audio data called DVD audio which is a kind of multibit linear audio data. This DVD audio is one system which is used to record audio data by using an optical disk called a DVD (Digital Video Disc or Digital Versatile Disc). Values are not limited to the above values shown in FIG. 13 and other values also may be defined.

Figure 14:
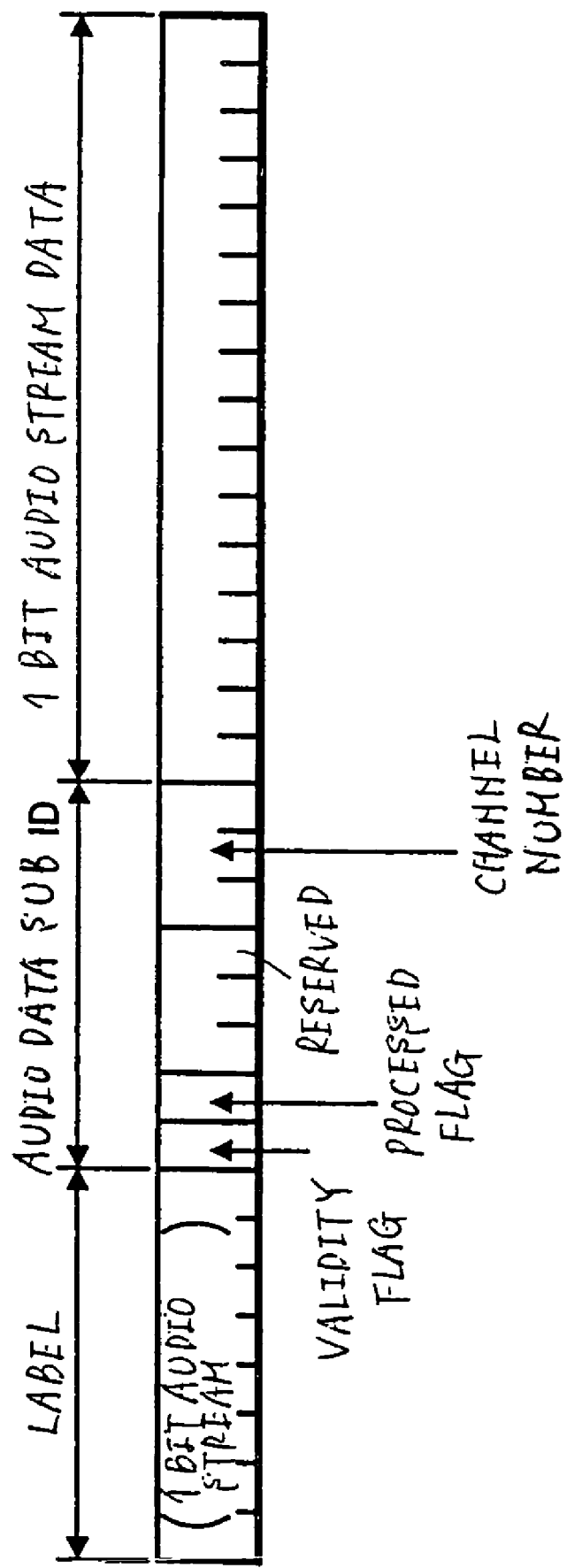
FIG. 14 is an explanatory diagram showing an example of a data arrangement used when one-bit system audio stream data is transmitted according to an embodiment of the present invention.

FIG. 14 shows an example of an arrangement of data used when a value indicating one-bit system audio stream data [One Bit Audio stream] is located as the label [LABEL] data. 8-bit data located at the starting portion of data in which one unit is formed of 32 bits as earlier described is label data. When the value indicating [One Bit Audio Stream] is located by the 8-bit label data, data accompanying with transmitted audio data (one bit-system audio data) is located at the 8-bit interval following this label data as audio data sub ID (Audio Data Sub ID).

In concrete, the audio data sub ID comprises 1-bit check flag (Validity Flag), 1-bit processed flag (Processed Flag) indicating whether or not the data is audio data reproduced from a medium and which is not processed and 3-bit channel number data (Channel Number). This channel number data is used to indicate the channel number of transmitted data when a set of audio data is comprised of a plurality of channels. When audio data is comprised of 2 channels, for example, the channel number data indicates 1 channel or 2 channels. Remaining 3 bits of audio data sub ID are reserved undefined.

A 16-bit interval following this audio data sub ID is allocated to an interval in which one-bit system audio stream data is located. One-bit system audio stream data herein is audio stream data, compressed by the DST system, reproduced from the SACD.

Figure 15:
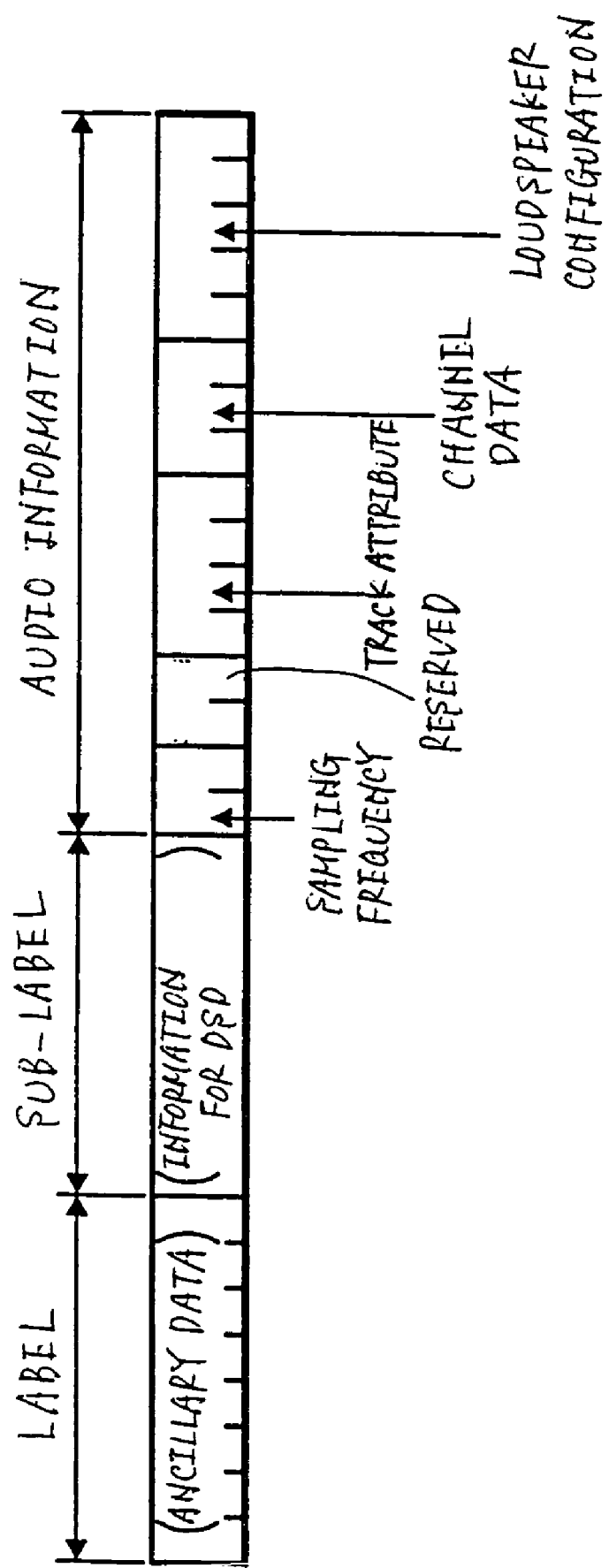
FIG. 15 is an explanatory diagram showing an example of an ancillary data arrangement used when one-bit system audio stream data is transmitted according to an embodiment of the present invention.

When audio stream data of this system is transmitted, ancillary data should be transmitted. FIG. 15 shows an arrangement of a block for transmitting the ancillary data. Specifically, a value indicating ancillary data [Ancillary Data] is located at the first 8-bit label data within 32 bits of one unit. An 8-bit interval following this label data is allocated to a sub-label data interval. Data concerning the DST system which is the compression system of transmitted audio data at this time is located at the sub-label interval. Audio information data is located at the remaining 16-bit interval. To be concrete, data concerning a sampling frequency of audio data is located by using 2 bits. Attribute data of a track serving as copy control data (data concerning copy control) is located by using 4 bits. Channel data (data indicating channel number) constituting the audio data is located by using 3 bits. Data concerning the number of loudspeaker channels is located by using 5 channels. The remaining 2 channels are reserved undefined.

The data concerning the number of the loudspeaker channels indicates the data is, for example, audio data reproduced as 2-channel stereo sounds, audio data reproduced when the loudspeakers are located by the 5 channels prescribed by the ITU standard or audio data reproduced when the loudspeakers are located by totally 6 channels of ITU standard 5 channel+LFE channel (low frequency exclusive channel).

FIG. 16 shows an arrangement used when DST system audio data is converted into isochronous transfer packets in actual practice by the above data array. Specifically, after the header data shown in FIG. 11 had been located, data shown in FIG. 14, i.e., the label data of the value indicative of one-bit system audio stream data, the data of the audio data sub ID and the audio data of the DST system in the remaining 16-bit interval are continuously located a predetermined number of times in response to the capacity of one packet thereby to transmit audio data of a predetermined amount. The data shown in FIG. 15, i.e., the label data of the value indicative of the ancillary data, the sub-label data concerning the DST system audio data and the audio information data are located at the last 4-byte data, for example.

When the packet having the arrangement shown in FIG. 16 is transmitted from the audio reproducing apparatus 100, for example, through the bus 1 to the audio amplifying apparatus 200, the DST system audio data of the raw format reproduced from the disk (or data which results from processing the audio data of this format) can be transmitted to the audio amplifying apparatus 200 still in the form of digital data, processed for outputting by the audio amplifying apparatus 200 and emanated from the speaker apparatus 24L, 24R connected to the amplifying apparatus.

In this case, since the data is assembled into packets as described above, the one-bit system audio stream data (DST system data) can be judged by the label data, the details concerning the one-bit system audio stream data can be judged by the audio data sub ID or the ancillary data so that the audio output processing section 23 of the audio amplifying apparatus 200 which is the device on the side which received this data can properly judge the data processing state (demodulation from the DST system data, etc.).

The processing for converting data into packets on the audio reproducing apparatus 100 side is executed by the transmission processing section 13 (FIG. 1) for generating data which is to be transmitted to the bus 1, for example. The processing in which respective data located at the packets are identified by the audio amplifying apparatus 200 side and respective data are extracted from the packets is executed by the transmission processing section 22 (FIG. 1), for example.

While the label data shows the one-bit system audio stream data and the DST-system audio data is transmitted in the example described so far, a value indicating the nonlinear PCM data [Nonlinear PCM] within the label data shown in FIG. 13 can be used as label data and similar audio data can be transmitted. An example of an arrangement of data used in this case will be described below.

Figure 17:
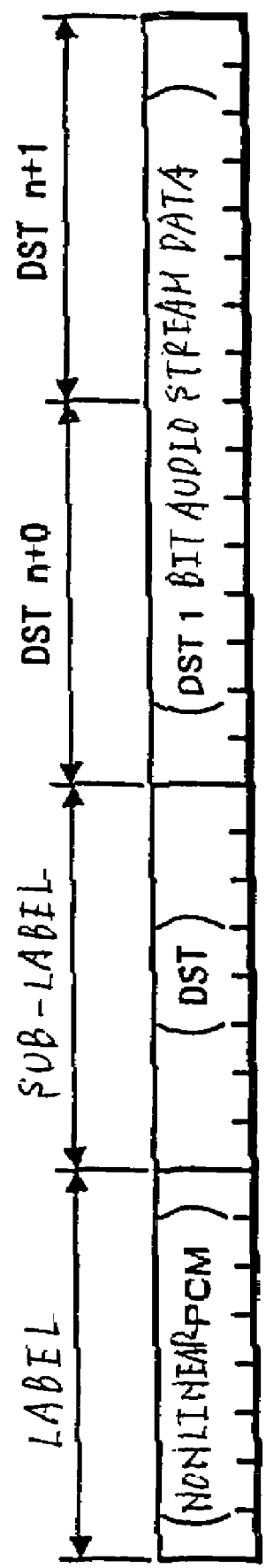
FIG. 17 is an explanatory diagram showing an example of a data arrangement used when compressed audio data is transmitted according to an embodiment of the present invention.

FIG. 17 is a diagram showing an example of an arrangement of data of one unit (32 bits) of this case. First, 8-bit label data at the starting portion shows nonlinear PCM data [Nonlinear PCM]. A following 8-bit interval is allocated to a sub-label data interval, and data concerning the nonlinear PCM compression system (data indicating DST system) is located by the sub-label data. DST-system one-bit audio stream data is located at the remaining 16-bit interval. Here, as the DST-system one-bit audio stream data, there are located two data, each of which is formed of 8 bits.

Figure 18:
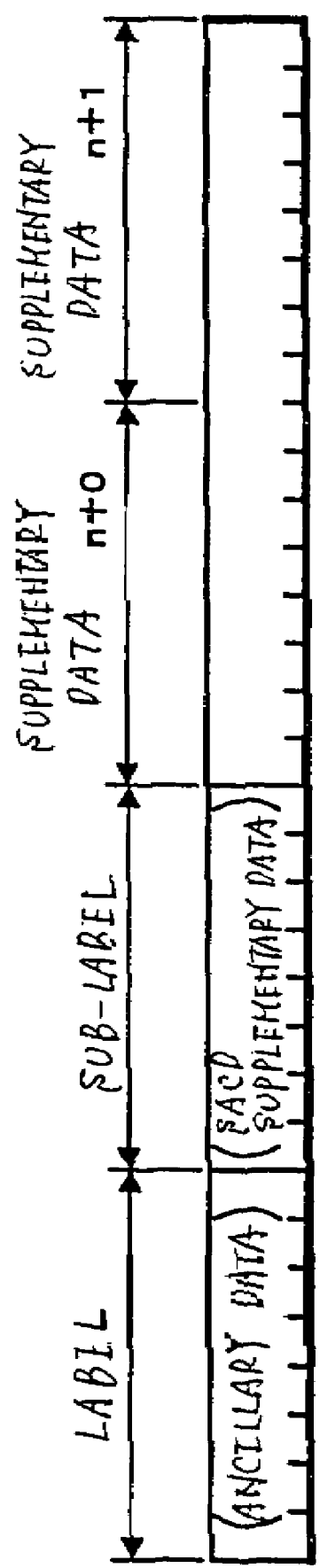
FIG. 18 is an explanatory diagram showing an example of an ancillary data arrangement used when compressed audio data is transmitted according to an embodiment of the present invention.

FIG. 18 shows an arrangement of ancillary data. Specifically, a value indicating ancillary data (Ancillary Data) is located by the starting 8-bit label data of 32 bits of one unit. Data such as a format concerning the data is located at an 8-bit sub-label data interval following this label data and various types of ancillary data are located at the remaining 16-bit interval.

FIG. 19 shows an example in which an isochronous transfer packet is made by using the data shown in FIGS. 17, 18, in actual practice. Also in this case, a large number of data blocks in which audio data is located are located successively in response to the capacity of data that can be transmitted by one packet.

When the transmission data is made as described above and the DST-system one-bit audio stream data is discriminated by using the label data indicating the nonlinear PCM data and the sub-label data indicating the DST system, data can satisfactorily be transmitted through the bus 1 similarly to the case of the data arrangement shown in FIG. 16. In the case of this example, since the label data shows that the data is only the compression-coded nonlinear PCM data and the sub-label shows the details of the format of its compression system, so long as the sub-label data can cope with the above compression system, the present invention becomes able to cope with audio data (PCM data) compressed by any compression system.

Next, the manner in which DVD audio data played back from the optical disk called a DVD is transmitted by similar packets will be described. This DVD audio data can be converted into multichannel audio, and data of main channel (2 channels) can be converted into data of a high quality such as data having a sampling frequency of 96 kHz.

Figure 20A:
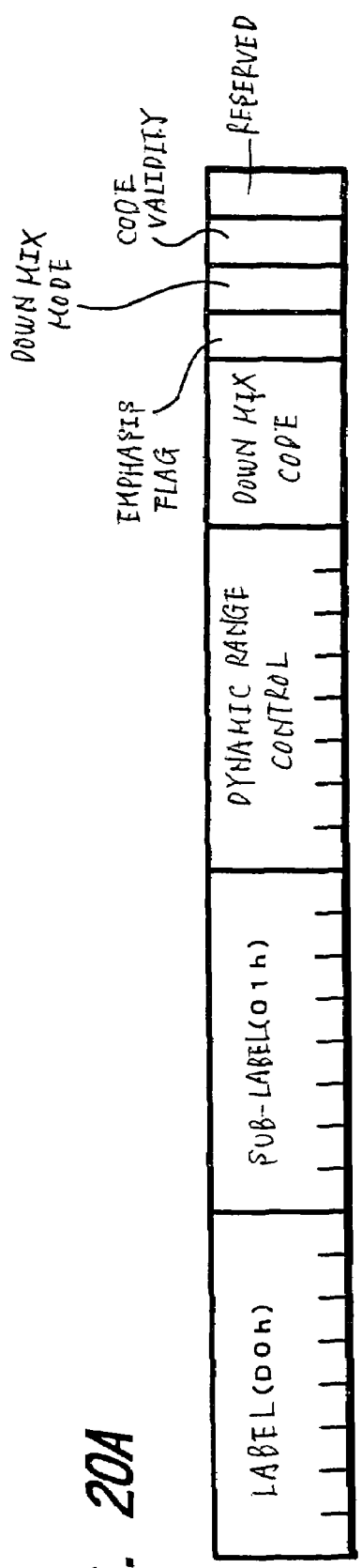
FIG. 20 is an explanatory diagram showing an example of an ancillary data arrangement used when DVD audio data is transmitted according to an embodiment of the present invention.
Figure 20B:
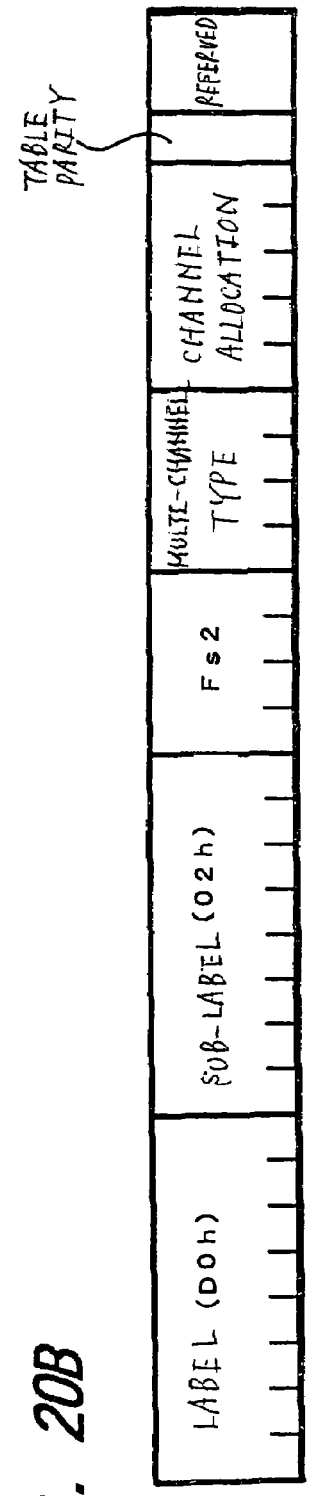

FIG. 20 shows a data arrangement of one quadlet (32 bits) used when ancillary data (Ancillary Data) for DVD audio is transmitted. In the case of the DVD audio, there are prescribed two kinds of ancillary data of data (assumed to be first ancillary data) shown in FIG. 20A and data (assumed to be second ancillary data) shown in FIG. 20B.

In the case of the first ancillary data shown in FIG. 20A, label [LABEL] data ("D0h" in this example) indicating ancillary data of 8 bits is located and a code ("01h" in this example) for identifying the first ancillary data is located at the succeeding sub-label. At the intervals following the sub-label, there are located 8-bit dynamic range control data, a 4-bit down-mix code, a 1-bit emphasis flag, a 1-bit down-mix mode and a 1-bit code validity. The last one-bit is reserved.

In the case of the second ancillary data shown in FIG. 20B, an 8-bit label [LABEL] data ("D0h" in this example) indicating ancillary data is located, and a code ("02h" in this example) for identifying the second ancillary data is located at the following sub-label. At the intervals following the sub-label, there are located 4-bit data [Fs2] for identifying a sampling frequency of audio data or the like, a 4-bit multi-channel type indicating a channel arrangement, a 5-bit channel assignment [channel Assignment] indicating a channel assignment and a 1-bit table parity. The last 2 bits are reserved.

Figure 21:
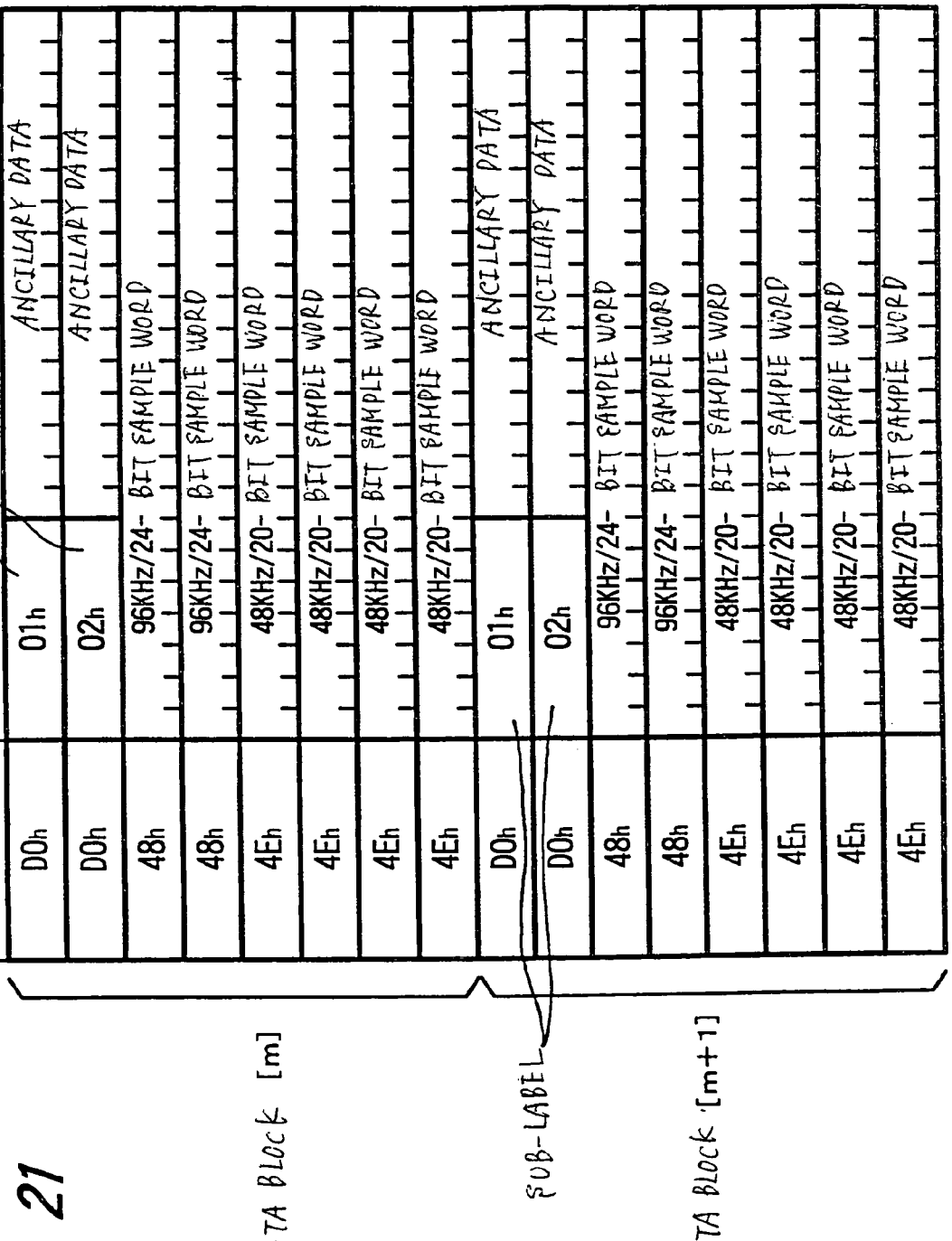
FIG. 21 is an explanatory diagram showing an example of an arrangement of the whole of data used when DVD audio data is transmitted according to an embodiment of the present invention.

FIG. 21 shows the state in which the ancillary data of the DVD audio having the above arrangement is located in the data blocks. This example assumes that data of a certain data block [m] and data of the next data block [m+1] are located in the isochronous packet of one unit. The first ancillary data shown in FIG. 20A is located at the first one quadlet interval, and the second ancillary data shown in FIG. 20B is located at the next one quadlet interval.

Then, there is located audio data of a predetermined number (6-quadlet interval). As audio data, a 24-bit sample word of one sample having a sampling frequency of 96 kHz is located at the 2-quadlet interval following an 8-bit label ("48h" in this example). An 8-bit label ("4Eh" in this example) is followed by a 20-bit sample word of one sample having a sampling frequency of 48 kHz located at the 4-quadlet interval. The audio data of the 6-quadlet interval are audio data the channels of which are different from each other, for example. The audio data having the sampling frequency of 96 kHz and the audio data having the sampling frequency of 48 kHz can be discriminated from each other by label data. In the quadlet interval in which the sample word whose one sample is formed of 20 bits, null data, for example, is located at the remaining 4-bit interval.

The arrangement that has been described so far is repeated at every data block.

When the DVD audio data is transmitted through the bus line, since label data is located at every unit and the sub-label data is located at the interval of the ancillary data so as to indicate the type of the ancillary data, data accompanying with transmitted DVD audio data can also be transmitted at the same time. Therefore, the side which received this data becomes able to easily learn the details of the received DVD audio data.

While the each packet arrangement shown in FIG. 16, FIG. 19, and FIG. 21 shows an example, the present invention is not limited to the above arrangement. For example, while the ancillary data is located at the end of one packet in the examples shown in FIGS. 16, 19, the ancillary data may be located at other intervals. Moreover, the packet may be made without ancillary data.

While transmitted audio data is the DST system audio data reproduced from the SACD or the DVD audio data reproduced from the DVD, the present invention is not limited thereto, and can be applied to the case in which other audio data similarly encoded are transmitted. For example, the DST system audio data reproduced from the SACD may be transmitted under the condition that the label of one-bit system audio stream data [One Bit Audio Stream] is located at the one-bit system audio stream data which was demodulated to the state in which the one-bit system audio stream data is not compressed.

While the audio data reproduced from the disk reproducing apparatus connected to the IEEE 1394 system bus line is transmitted to the amplifying apparatus in the above embodiment, the present invention is not limited thereto and can be applied to the case in which audio data that was inputted (inputted data contains data obtained by reproduction, etc.) to the AV-device serving as another audio input section is transmitted through a transmission line such as a bus line of a predetermine system to another device.

With respect to the format of the bus line which is the transmission line, it is needless to say that a data transmission line of a system other than the IEEE 1394 format bus line also can be applied to the present invention. In this case, the bus line of the transmission line for executing the data transmission is not always limited to a wired bus line and the present invention can also be applied to the case in which data having a similar arrangement is transmitted through a transmission line for transmitting data via radio waves. For example, the data arrangement according to the present invention can also be applied to the case in which audio data converted into packets by a similar data structure is transmitted among a plurality of devices by using a radio transmission line of a standard called a Bluetooth.

DESCRIPTION OF REFERENCE NUMERALS

1 . . . the IEEE 1394 system bus line
11 . . . the disk reproducing section
12 . . . the controller
13 . . . the transmission processing section
21 . . . the controller
22 . . . the transmission processing section
23 . . . the audio output processing section
24L, 24R . . . the speaker apparatus
71, 72, 73 . . . the AV-device
100 . . . the audio reproducing apparatus
101 . . . the disk
102 . . . the optical pickup
103 . . . the reproduction processing section
104 . . . the digital-to-analog converter
105 . . . the analog processing section
106 . . . the central processing unit (CPU)
107 . . . the RAM
108 . . . the button
109 . . . the interface section
200 . . . the audio amplifying apparatus
201 . . . the selecting section
202 . . . the analog-to-digital converter
303 . . . the signal processing section 204 . . . the digital-to-analog converter
205 . . . the analog processing section
211 . . . the central processing unit (CPU)
212 . . . the RAM
213 . . . the button
214 . . . the display section
215 . . . the interface section

The invention claimed is:

1. A transmission method of transmitting data having a predetermined data length as a unit between devices for transmitting data through an IEEE 1394 bus by a predetermined format, said transmission method comprising the steps of:
   locating label data indicating a system of transmitted audio stream data at a starting portion of said data having said predetermined data length as a unit by use of a processing section of a respective one of the devices; and
   locating said audio stream data of said system at an interval behind said label data and transmitting resultant data by use of the processing section of the respective one of the devices,
   wherein said predetermined format is a format complying with a protocol for transmitting data in an isochronous transfer mode of an IEEE 1394 bus and a plurality of data having said predetermined data length as a unit are located at an interval following a header prescribed by said protocol, and
   wherein sub-label data is located at an interval following said label data, and data accompanying said audio stream data of said system is located at an interval following said sub-label data in data of a part of a unit of said plurality of data having the predetermined data length as a unit, and said audio stream data of said system is located at an interval following said label data in data of a remaining unit.

2. The transmission method according to claim 1, wherein said located audio stream data is one of one-bit system audio stream data and data resulting from compressing the stream data.

3. The transmission method according to claim 1, wherein said located audio stream data is audio stream data from a DVD audio system.

4. A transmission apparatus comprising:
   audio data input means for obtaining audio stream data of a predetermined system;
   transmission data generating means for dividing data obtained by said audio data input means into data having a predetermined data length, and for obtaining transmission data having a predetermined format by locating label data indicating a system of transmitted data at a starting portion of each divided data; and
   transmission means for transmitting said transmission data generated by said transmission data generating means to an IEEE 1394 bus,
   wherein a predetermined format generated by said transmission data generating means is a format complying with a protocol for transmitting data in an isochronous transfer mode an IEEE 1394 bus, and a plurality of said data having said predetermined data length as a unit are located at an interval following a header prescribed by said protocol, and
   a sub-label is located at an interval following said label data, and
   data accompanying said audio stream data of said system is located at an interval behind the sub-label in data of a part of a unit of a plurality of data having a predetermined data length as a unit located by said transmission data generating means, and
   said audio stream data of said system is located at an interval following said label data in data of the remaining unit.

5. The transmission apparatus according to claim 4, wherein said audio stream data obtained by said audio data input means and which is located by said transmission data generating means is one of one-bit system audio stream data and data which results from compressing the stream data.

6. The transmission apparatus according to claim 4, wherein said audio stream data obtained by said audio data input means and which is located by said transmission data generating means is audio stream data of a DVD audio system.

7. A transmission apparatus comprising:
   reception means for receiving data transmitted through an IEEE 1394 bus;
   identification means for setting data received by said reception means to data having a predetermined data length as a unit, and for identifying label data located at the starting portion of each unit; and
   audio data processing means for judging a system of audio stream data located at the interval following said label data based on identified results of said identification means and executing audio data processing based on the judged system
   wherein said identification means identifies data from said data having said predetermined data length as a unit during an interval following a header prescribed by a protocol in which said data is transferred in an isochronous transfer mode through said IEEE 1394 bus and,
   wherein said identification means identifies sub-label data located at an interval following said label data from data of a part of a unit of said data having said predetermined data length as a unit, and detects data accompanying audio stream data from data located at an interval behind the sub-label if said sub-label data is identified.

8. The transmission apparatus according to claim 7, wherein said identification means identifies based one of said label data and said sub-label data that one of one-bit system audio stream data and data which results from compressing the stream data is received.

9. The transmission apparatus according to claim 7, wherein said identification means identifies based on one of said label data and said sub-label data that audio stream data of a DVD audio system is received.

* * * * *

UNITED STATES PATENT AND TRADEMARK OFFICE
CERTIFICATE OF CORRECTION

| | |
|---|---|
| PATENT NO. | : 7,646,793 B2 |
| APPLICATION NO. | : 11/109051 |
| DATED | : January 12, 2010 |
| INVENTOR(S) | : Gen Ichimura et al. |

Page 1 of 1

It is certified that error appears in the above-identified patent and that said Letters Patent is hereby corrected as shown below:

On the face of the patent, the Related U.S. Application Data should read --Continuation of Application No. 09/744,429, filed as Application No. PCT/JP00/03368 on June 13, 2001, now U.S. Patent No. 6,947,422--;

On the face of the patent, please add --Foreign Application Priority Data Japan P11-145410 filed May 25, 1999--.

Signed and Sealed this
Third Day of May, 2011

David J. Kappos
*Director of the United States Patent and Trademark Office*